US009602146B2

(12) United States Patent
Granger-Jones et al.

(10) Patent No.: US 9,602,146 B2
(45) Date of Patent: Mar. 21, 2017

(54) RF FRONT END ARCHITECTURE (71) Applicant: RF Micro Devices, Inc., Greensboro, NC (US)

(72) Inventors: Marcus Granger-Jones, Scotts Valley, CA (US); Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 111 days.

(21) Appl. No.: 14/611,850

(22) Filed: Feb. 2, 2015

(65) Prior Publication Data

US 2016/0119003 A1 Apr. 28, 2016

Related U.S. Application Data

(60) Provisional application No. 62/068,362, filed on Oct. 24, 2014.

(51) Int. Cl.
*H04B 1/00* (2006.01)
*H04L 5/14* (2006.01)
*H04L 5/00* (2006.01)

(52) U.S. Cl.
CPC ........... *H04B 1/0057* (2013.01); *H04B 1/006* (2013.01); *H04L 5/001* (2013.01); *H04L 5/14* (2013.01); *H04L 5/0023* (2013.01)

(58) Field of Classification Search
None
See application file for complete search history.

(56) References Cited

U.S. PATENT DOCUMENTS

2014/0227982 A1* 8/2014 Granger-Jones ..... H04B 7/0404
455/77

* cited by examiner

*Primary Examiner* — Fan Ng
(74) *Attorney, Agent, or Firm* — Withrow & Terranova, P.L.L.C.

(57) ABSTRACT

RF front end circuitry includes mid/high-band switching circuitry and a carrier-aggregation diplexer. The mid/high-band switching circuitry is configured to receive and selectively route mid-band and high-band signals between a mid/high-band output port and a number of mid/high-band transceiver ports. The carrier-aggregation diplexer is coupled to a first one of the mid/high-band transceiver ports. Further, the carrier-aggregation diplexer is configured to pass mid-band signals between a mid-band diplexer port and the first one of the mid/high-band transceiver ports while attenuating other signals, and pass high-band signals between a high-band diplexer port and the first one of the mid/high-band transceiver ports while attenuating other signals.

21 Claims, 10 Drawing Sheets

| OPERATING BAND | UPLINK (UL) OPERATING BAND | DOWNLINK (DL) OPERATING BAND | DUPLEX MODE |
|---|---|---|---|
| 1 | 1920-1980 | 2110-2170 | FDD |
| 2 | 1850-1910 | 1920-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 865-875 | FDD |
| 7 | 2500-2570 | 2620-2690 | FDD |
| 8 | 880-915 | 925-960 | FDD |
| 9 | 1749.9-1784.9 | 1844.9-1879.9 | FDD |
| 10 | 1710-1770 | 2110-2170 | FDD |
| 11 | 1427.9-1447.9 | 1475.9-1495.9 | FDD |
| 12 | 698-716 | 728-746 | FDD |
| 13 | 777-787 | 746-756 | FDD |
| 14 | 788-798 | 758-768 | FDD |
| 15 | RESERVED | RESERVED | - |
| 16 | RESERVED | RESERVED | - |
| 17 | 704-716 | 734-746 | FDD |
| 18 | 815-830 | 860-875 | FDD |
| 19 | 830-845 | 875-890 | FDD |
| 20 | 832-862 | 791-821 | FDD |
| 21 | 1447.9-1462.9 | 1495.9-1510.9 | FDD |
| 22 | 3410-3500 | 3510-3600 | FDD |
| ... | ... | ... | ... |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| 37 | 1910-1930 | 1910-1930 | TDD |
| 38 | 2570-2620 | 2570-2620 | TDD |
| 39 | 1880-1920 | 1880-1920 | TDD |
| 40 | 2300-2400 | 2300-2400 | TDD |
| 41 | 3400-3600 | 3400-3600 | TDD |

RF FRONT END ARCHITECTURE

RELATED APPLICATIONS

This application claims the benefit of U.S. provisional patent application Ser. No. 62/068,362, filed Oct. 24, 2014, the disclosure of which is incorporated herein by reference in its entirety.

FIELD OF THE DISCLOSURE

The present disclosure relates to radio frequency (RF) front end circuitry, and specifically to RF front end circuitry configured to support one or more carrier aggregation configurations.

BACKGROUND

Modern mobile telecommunications standards continue to demand increasingly greater rates of data exchange (data rates). One way to achieve a high data rate in a mobile device is through the use of carrier aggregation. Carrier aggregation allows a single mobile device to aggregate bandwidth across one or more operating bands in the wireless spectrum. The increased bandwidth achieved as a result of the carrier aggregation allows a mobile device to obtain higher data rates than have previously been available.

Figure 1:
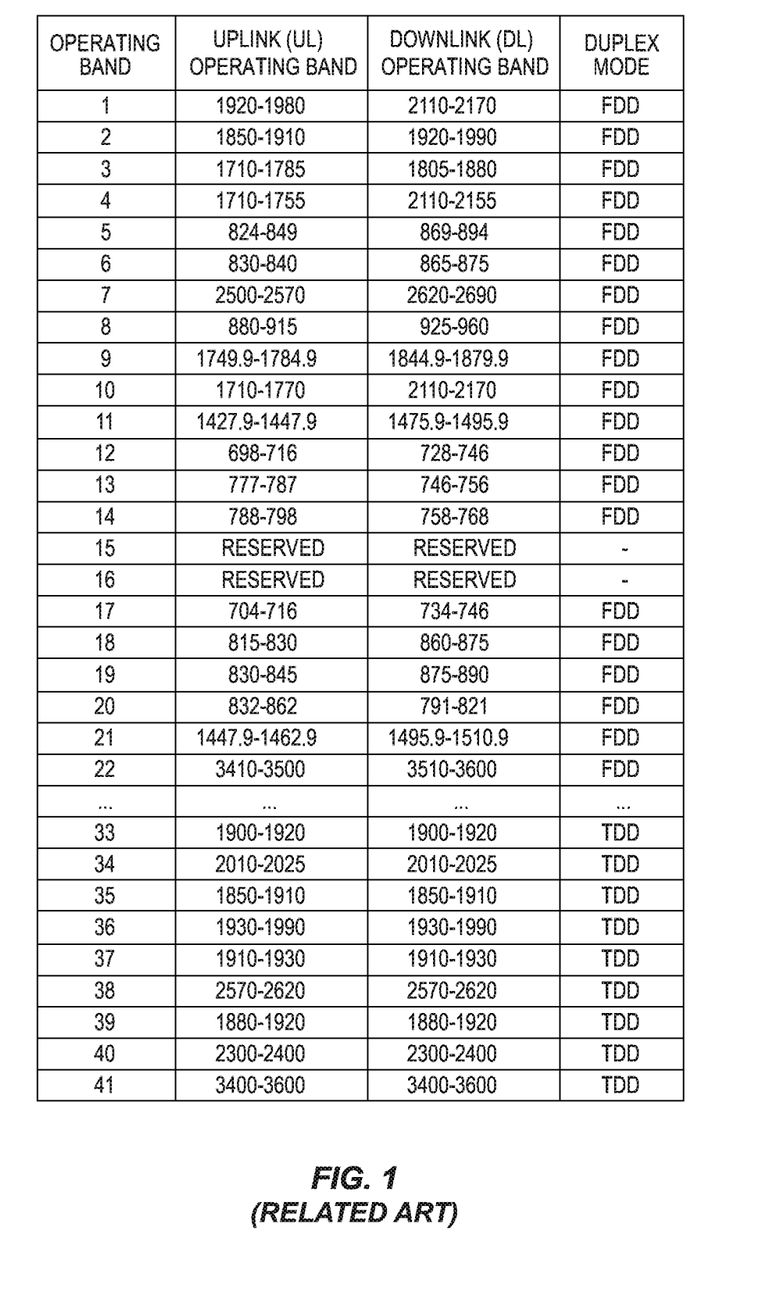
FIG. 1 is a table showing a number of operating bands within the wireless spectrum.

FIG. 1 shows a table describing a number of operating bands in the wireless spectrum. One or more of the operating bands may be used, for example, in a CDMA, GSM, LTE, or LTE-advanced equipped mobile device. The first column indicates the operating band number for each one of the operating bands. The second and third columns indicate the uplink and downlink frequency bands for each one of the operating bands, respectively. Finally, the fourth column indicates the duplex mode for each one of the operating bands. In non-carrier aggregation configurations, a mobile device will generally communicate using a single portion of the uplink or downlink frequency bands within a single operating band. In carrier aggregation applications, however, a mobile device may aggregate bandwidth across a single operating band or multiple operating bands in order to increase the data rate of the device.

Figure 2A:
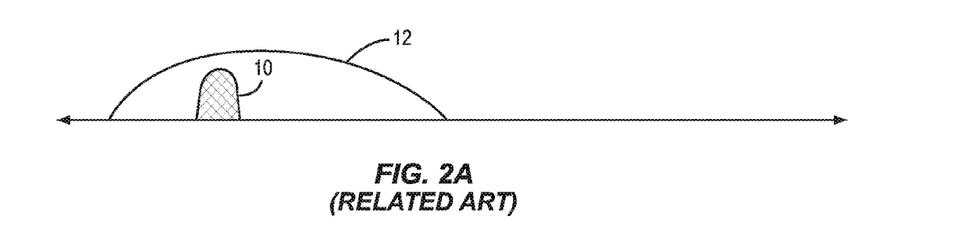
FIGS. 2A through 2D are diagrams showing a variety of carrier aggregation configurations for use in a mobile terminal.

FIG. 2A shows a diagram representing a conventional, non-carrier aggregation configuration for a mobile device. In the conventional configuration, a mobile device communicates using a single portion of the wireless spectrum 10 within a single operating band 12. Under the conventional approach, the data rate of the mobile device is constrained by the limited available bandwidth.

Figure 2B:
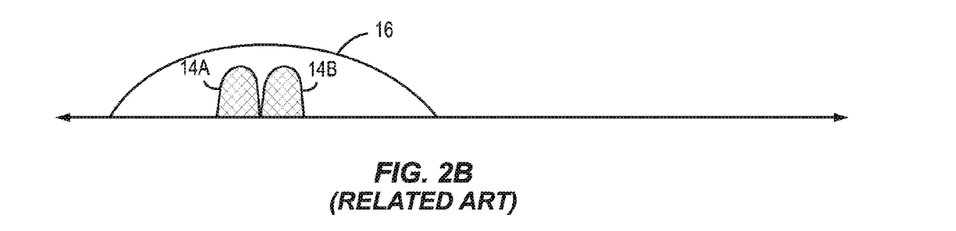
Figure 2C:
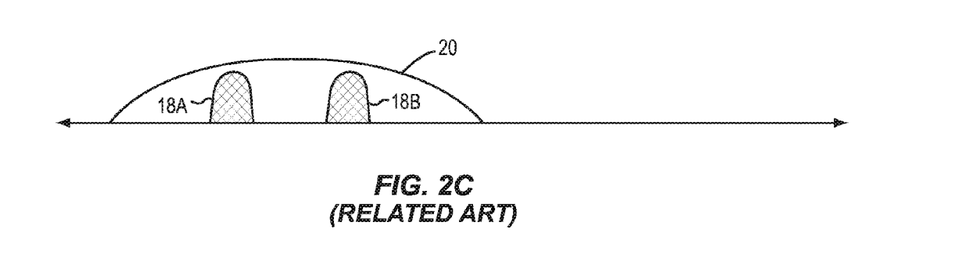
Figure 2D:
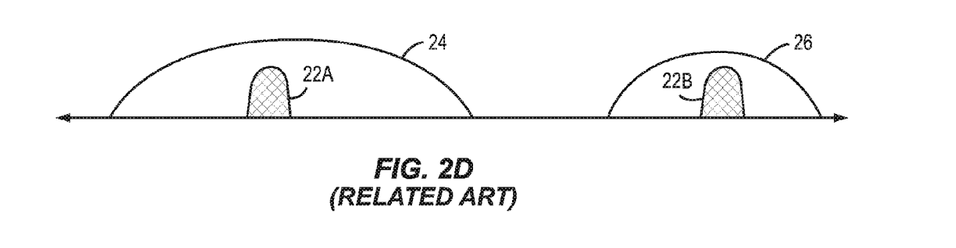

FIGS. 2B through 2D show diagrams representing a variety of carrier aggregation configurations for a mobile device. FIG. 2B shows an example of contiguous, intra-band carrier aggregation, in which the aggregated portions of the wireless spectrum 14A and 14B are located directly adjacent to one another and are in the same operating band 16. FIG. 2C shows an example of non-contiguous intra-band carrier aggregation, in which the aggregated portions of the wireless spectrum 18A and 18B are located within the same operating band 20, but are not directly adjacent to one another. Finally, FIG. 2D shows an example of inter-band carrier aggregation, in which the aggregated potions of the wireless spectrum 22A and 22B are located in different operating bands 24 and 26. A modern mobile device should be capable of supporting each one of the previously described carrier aggregation configurations.

The use of carrier aggregation may pose unique problems for the radio frequency (RF) front end circuitry in a mobile device. For instance, a mobile device using carrier aggregation may require two or more antennas. The use of more than one antenna may complicate the design of the RF front end circuitry, thereby increasing the size and cost of the RF front end circuitry. Additionally, the use of carrier aggregation across certain operating bands may cause undesirable interference between transmit and receive circuitry in a mobile device that renders the mobile device unusable in these operating bands.

Figure 3:
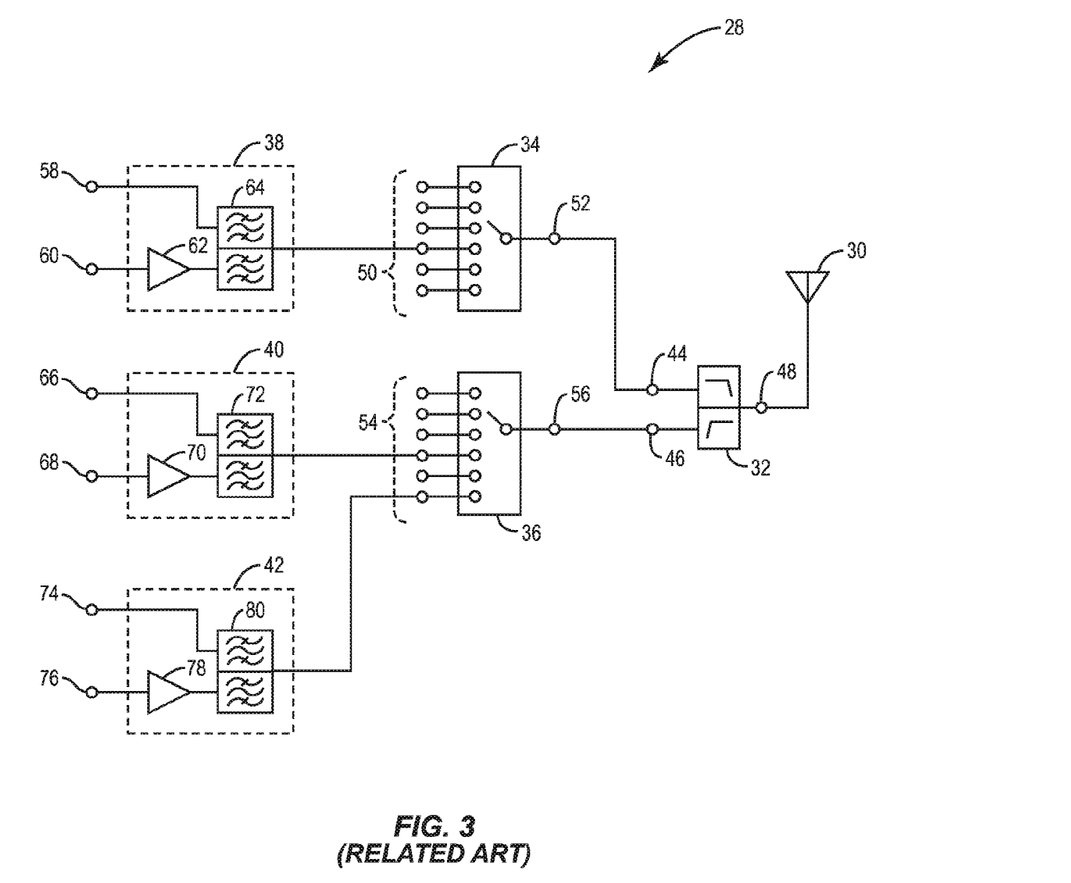
FIG. 3 is a schematic representation of conventional radio frequency (RF) front end circuitry.

FIG. 3 shows conventional RF front end circuitry 28 for use in a mobile terminal. The conventional RF front end circuitry 28 includes an antenna 30, a diplexer 32, low-band switching circuitry 34, mid/high-band switching circuitry 36, low-band transceiver circuitry 38, mid-band transceiver circuitry 40, and high-band transceiver circuitry 42. The diplexer 32 includes a low-band diplexer port 44, a mid/high-band diplexer port 46, and an antenna port 48, which is coupled to the antenna 30. The low-band switching circuitry 34 includes a number of low-band transceiver ports 50 and a low-band output port 52, which is coupled to the low-band diplexer port 44. The mid/high-band switching circuitry 36 includes a number of mid/high-band transceiver ports 54 and a mid/high-band output port 56, which is coupled to the mid/high-band diplexer port 46. The low-band transceiver circuitry 38 is coupled to a first one of the low-band transceiver ports 50. The mid-band transceiver circuitry 40 is coupled to a first one of the mid/high-band transceiver ports 54. Finally, the high-band transceiver circuitry 42 is coupled to a second one of the mid/high-band transceiver ports 54.

The low-band transceiver circuitry 38 includes a low-band receive port 58, a low-band transmit port 60, a low-band power amplifier 62, and a low-band duplexer 64. The low-band receive port 58 is coupled to the low-band switching circuitry 34 via the low-band duplexer 64. Further, the low-band transmit port 60 is coupled to the low-band switching circuitry 34 via the low-band power amplifier 62 and the low-band duplexer 64. The low-band duplexer 64 is configured to separate low-band receive signals about a low-band operating band from low-band transmit signals about the low-band operating band, passing the signals appropriately to either the low-band receive port 58 or from the low-band transmit port 60 via the low-band power amplifier 62.

The mid-band transceiver circuitry 40 includes a mid-band receive port 66, a mid-band transmit port 68, a mid-band power amplifier 70, and a mid-band duplexer 72. The mid-band receive port 66 is coupled to the mid/high-band switching circuitry 36 via the mid-band duplexer 72. Further, the mid-band transmit port 68 is coupled to the mid/high-band switching circuitry 36 via the mid-band power amplifier 70 and the mid-band duplexer 72. The mid-band duplexer 72 is configured to separate mid-band receive signals about a mid-band operating band from mid-band transmit signals about the mid-band operating band, passing the signals appropriately to either the mid-band receive port 66 or from the mid-band transmit port 68 via the mid-band power amplifier 70.

The high-band transceiver circuitry 42 includes a high-band receive port 74, a high-band transmit port 76, a high-band power amplifier 78, and a high-band duplexer 80. The high-band receive port 74 is coupled to the mid/high-band switching circuitry 36 via the high-band duplexer 80. Further, the high-band transmit port 76 is coupled to the mid/high-band switching circuitry 36 via the high-band power amplifier 78 and the high-band duplexer 80. The high-band duplexer 80 is configured to separate high-band receive signals about a high-band operating band from high-band transmit signals about the high-band operating band, passing the signals appropriately to either the high-band receive port 74 or from the high-band transmit port 76 via the high-band power amplifier 78.

In operation, the diplexer 32 passes low-band signals between the antenna 30 and the low-band switching circuitry 34 while attenuating other signals. Further, the diplexer 32 passes mid-band and high-band signals between the antenna 30 and the mid/high-band switching circuitry 36 while attenuating other signals. The low-band switching circuitry 34 selectively routes low-band signals between the low-band output port 52 and the low-band transceiver ports 50. The mid/high-band switching circuitry 36 selectively routes mid-band and high-band signals between the mid/high-band output port 56 and the mid/high-band transceiver ports 54. The low-band transceiver circuitry 38 provides low-band transmit signals about a low-band operating band to the low-band switching circuitry 34 via the low-band power amplifier 62 and receives low-band signals about the low-band operating band from the low-band switching circuitry 34 at the low-band receive port 58. The mid-band transceiver circuitry 40 provides mid-band transmit signals about a mid-band operating band to the mid/high-band switching circuitry 36 via the mid-band power amplifier 70 and receives mid-band signals about the mid-band operating band from the mid/high-band switching circuitry 36 at the mid-band receive port 66. The high-band transceiver circuitry 42 provides high-band transmit signals about a high-band operating band to the mid/high-band switching circuitry 36 via the high-band power amplifier 78 and receives high-band signals about the high-band operating band from the mid/high-band switching circuitry 36 at the high-band receive port 74.

While the conventional RF front end circuitry 28 is capable of inter-band carrier aggregation between the low-band operating band and either the mid-band or the high-band operating band, the conventional RF front end circuitry 28 cannot perform inter-band carrier aggregation between the mid-band operating band and the high-band operating band. Specifically, due to the fact that mid-band signals and high-band signals are not separately filtered by the diplexer 32 and both delivered to the mid/high-band switching circuitry 36, there is no way to separate these signals in the conventional RF front end circuitry 28. Accordingly, the conventional RF front end circuitry 28 may be unacceptable in certain wireless environments in which it is necessary to aggregate bandwidth across the mid-band operating band and the high-band operating band.

Figure 4:
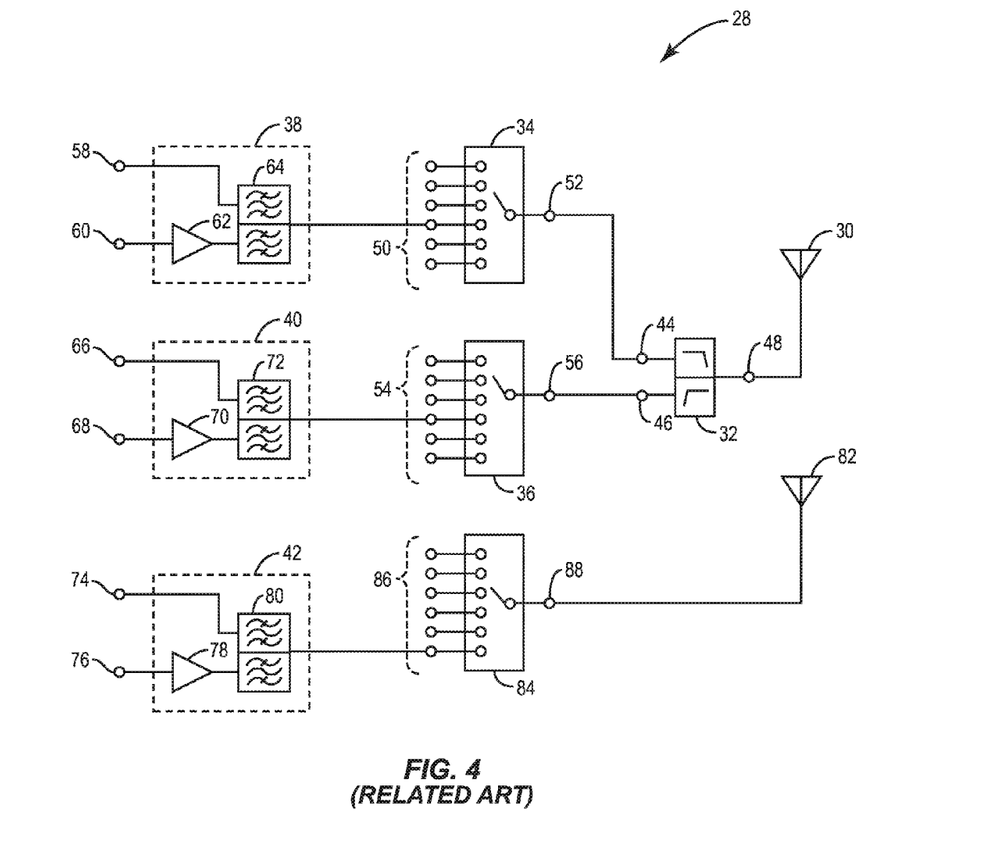
FIG. 4 is a schematic representation of conventional RF front end circuitry.

Accordingly, FIG. 4 shows the conventional RF front end circuitry 28 further including an additional antenna 82 and high-band switching circuitry 84. In the conventional RF front end circuitry 28 shown in FIG. 4 the mid/high-band switching circuitry 36 is only mid-band switching circuitry 36 such that the mid/high-band transceiver ports 54 and the mid/high-band output port 56 are mid-band transceiver ports 54 and a mid-band output port 56, respectively. Further, the diplexer 32 is configured to route only mid-band signals (rather than both mid-band and high-band signals) between the antenna 30 and the mid-band switching circuitry 36, while attenuating other signals. The high-band switching circuitry 84 includes a number of high-band transceiver ports 86 and a high-band output port 88, which is coupled to the additional antenna 82. The high-band transceiver circuitry 42 is coupled to one of the high-band transceiver ports 86. By adding the additional antenna 82 and the high-band switching circuitry 84 to the conventional RF front end circuitry 28, the conventional RF front end circuitry 28 can operate in inter-band carrier aggregation configurations between the low-band operating band, the mid-band operating band, and the high-band operating band. However, adding the additional antenna 82 consumes additional space in the conventional RF front end circuitry 28 and further adds cost to the circuitry.

Figure 5:
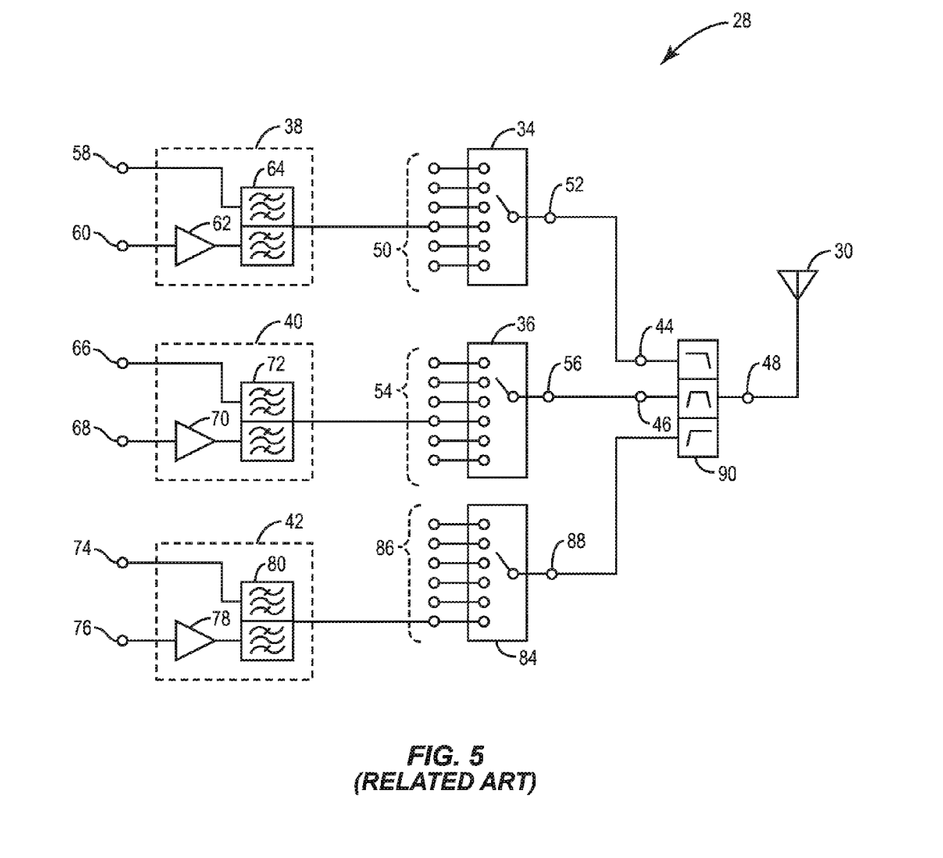
FIG. 5 is a schematic representation of conventional RF front end circuitry.

FIG. 5 shows the conventional RF front end circuitry 28 as in FIG. 4 wherein the additional antenna 82 is removed and the diplexer 32 is replaced with a triplexer 90. The high-band output port 88 is coupled to the triplexer 90. Further, the triplexer 90 is configured to pass low-band signals between the low-band switching circuitry 34 and the antenna 30 while attenuating other signals, pass mid-band signals between the mid-band switching circuitry 36 and the antenna while attenuating other signals, and pass high-band signals between the high-band switching circuitry 84 and the antenna while attenuating other signals. Accordingly, the conventional RF front end circuitry 28 may operate in inter-band carrier aggregation configurations between the low-band operating band, the mid-band operating band, and the high-band operating band. However, replacing the diplexer 32 with the triplexer 90 results in a significant increase in the complexity of the conventional RF front end circuitry 28. As the filter order of the circuitry increases, so does the complexity, area, and expense associated therewith. Accordingly, constructing a high quality triplexer results in an increase in both area and expense, and further adds insertion loss in the signal path of the antenna 30.

Figure 6:
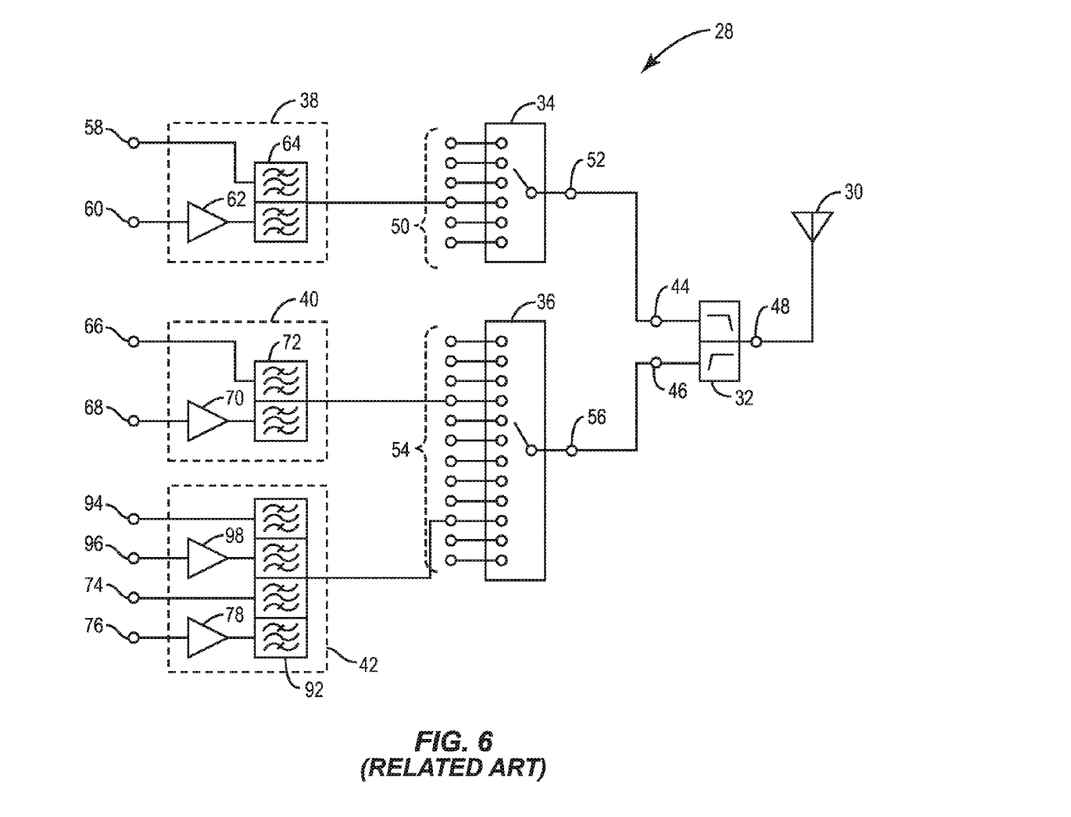
FIG. 6 is a schematic representation of conventional RF front end circuitry.

FIG. 6 shows the conventional RF front end circuitry 28 as in FIG. 3 wherein the high-band transceiver circuitry 42 includes a quadplexer 92, an additional mid-band receive port 94, an additional mid-band transmit port 96, and an additional mid-band power amplifier 98 such that the high-band transceiver circuitry 42 is configured to transmit and receive both mid-band and high-band signals. The quadplexer 92 shown in FIG. 6 filters and separates mid-band receive signals about a mid-band operating band, mid-band transmit signals about the mid-band operating band, high-band receive signals about a high-band operating band, and high-band transmit signals about the high-band operating band. In non-carrier aggregation configurations the conventional RF front end circuitry 28 may use the mid-band transceiver circuitry 40 to transmit and receive mid-band signals about the mid-band operating band. However, in one or more carrier aggregation configurations, the conventional RF front end circuitry 28 may use the high-band transceiver circuitry 42 to transmit and receive both signals about the mid-band operating band and the high-band operating band. Accordingly, mid-band and high-band signals are filtered in the high-band transceiver circuitry 42 itself, thereby allowing the conventional RF front end circuitry 28 to operate in inter-band carrier aggregation configurations between the low-band operating band, the mid-band operating band, and the high-band operating band. However, similar to the triplexer 90 discussed above, the quadplexer 92 shown in FIG. 6 is difficult to manufacture, resulting in increases in the area and expense associated with the conventional RF front end circuitry 28. While the insertion loss associated with the quadplexer 92 is limited to a downstream signal path, the performance of the conventional RF front end circuitry 28 will still suffer in a carrier aggregation configuration utilizing the mid-band operating band and the high-band operating band.

Accordingly, there is a need for RF front end circuitry capable of operating in a variety of carrier aggregation configurations using a single antenna feed, while simultaneously avoiding higher order filters such as triplexers and quadplexers.

SUMMARY

The present disclosure relates to radio frequency (RF) front end circuitry, and specifically to RF front end circuitry configured to support one or more carrier aggregation configurations. In one embodiment, RF front end circuitry includes mid/high-band switching circuitry and a carrier-aggregation diplexer. The mid/high-band switching circuitry is configured to receive and selectively route mid-band and high-band signals between a mid/high-band output port and a number of mid/high-band transceiver ports. The carrier-aggregation diplexer is coupled to a first one of the mid/high-band transceiver ports. Further, the carrier-aggregation diplexer is configured to pass mid-band signals between a mid-band diplexer port and the first one of the mid/high-band transceiver ports while attenuating other signals, and pass high-band signals between a high-band diplexer port and the first one of the mid/high-band transceiver ports while attenuating other signals. By including the carrier-aggregation diplexer coupled to the mid/high-band switching circuitry, the RF front end circuitry may operate in carrier aggregation configurations between mid-band operating bands and high-band operating bands without the use of complex high-order filters.

In one embodiment, the RF front end circuitry further includes a single-feed antenna port, low-band switching circuitry, and an antenna-side diplexer. The low-band switching circuitry is configured to receive and selectively route low-band signals between a low-band output port and a number of low-band transceiver ports. The antenna-side diplexer is coupled between the single-feed antenna port, the low-band output port, and the mid/high-band output port. Further, the antenna-side diplexer is configured to pass low-band signals between the single-feed antenna port and the low-band output port while attenuating other signals, and pass mid-band and high-band signals between the single-feed antenna port and the mid/high-band output port while attenuating other signals.

In one embodiment, the RF front end circuitry further includes mid-band transceiver circuitry coupled to the mid-band diplexer port and high-band transceiver circuitry coupled to the high-band diplexer port. The mid-band transceiver circuitry may additionally be coupled to a second one of the mid/high-band transceiver ports, and the high-band transceiver circuitry may additionally be coupled to a third one of the mid/high-band transceiver ports.

In one embodiment, the mid-band transceiver circuitry is coupled to the mid-band diplexer port via a mid-band diplexer switch. Further, the high-band transceiver circuitry is coupled to the high-band diplexer port via a high-band diplexer switch. In a carrier aggregation mode of operation of the RF front end circuitry, the mid-band diplexer switch and the high-band diplexer switch are closed such that the mid-band transceiver circuitry is coupled to the mid-band diplexer port and the high-band transceiver circuitry is coupled to the high-band diplexer port. In a non-carrier aggregation configuration of the RF front end circuitry, the mid-band diplexer switch and the high-band diplexer switch are opened such that the mid-band transceiver circuitry is not coupled to the mid-band diplexer port and the high-band transceiver circuitry is not coupled to the high-band diplexer port.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 7:
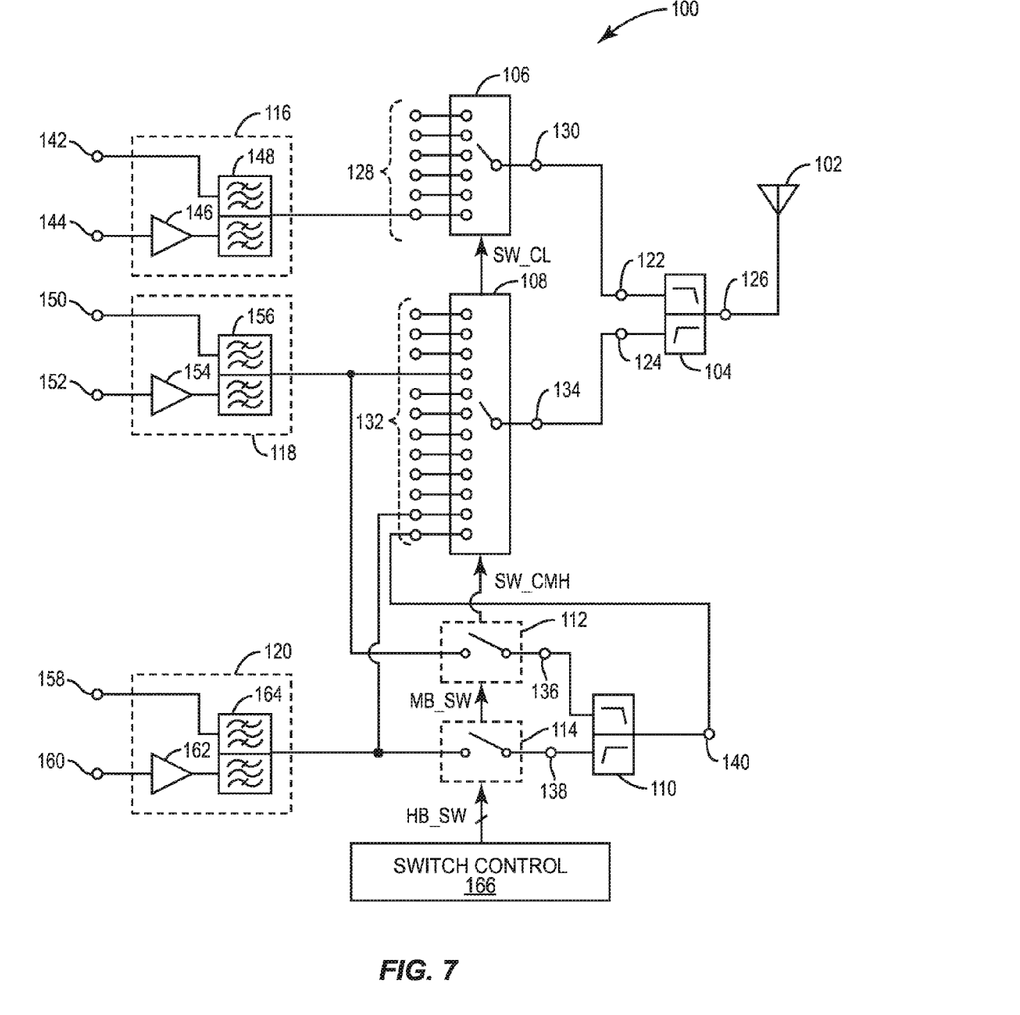
FIG. 7 is a schematic representation of RF front end circuitry according to one embodiment of the present disclosure.

FIG. 7 shows RF front end circuitry 100 according to one embodiment of the present disclosure. The RF front end circuitry 100 includes an antenna 102, an antenna-side diplexer 104, low-band switching circuitry 106, mid/high-band switching circuitry 108, a carrier-aggregation diplexer 110, mid-band diplexer switching circuitry 112, high-band diplexer switching circuitry 114, low-band transceiver circuitry 116, mid-band transceiver circuitry 118, and high-band transceiver circuitry 120. The antenna-side diplexer 104 includes a low-band diplexer port 122, a mid/high-band diplexer port 124, and an antenna port 126, which is coupled to the antenna 102. The low-band switching circuitry 106 includes a number of low-band transceiver ports 128 and a low-band output port 130, which is coupled to the low-band diplexer port 122. The mid/high-band switching circuitry 108 includes a number of mid/high-band transceiver ports 132 and a mid/high-band output port 134, which is coupled to the mid/high-band diplexer port 124. The low-band transceiver circuitry 116 is coupled to a first one of the low-band transceiver ports 128. The carrier-aggregation diplexer 110 includes a mid-band diplexer port 136, a high-band diplexer port 138, and a mid/high-band diplexer switching port 140, which is coupled to a first one of the mid/high-band transceiver ports 132. The mid-band transceiver circuitry 118 is coupled to the mid-band diplexer port 136 via the mid-band diplexer switching circuitry 112 and further is coupled to a second one of the mid/high-band transceiver ports 132. The high-band transceiver circuitry 120 is coupled to the high-band diplexer port 138 via the high-band diplexer switching circuitry 114 and further is coupled to a third one of the mid/high-band transceiver ports 132.

The low-band transceiver circuitry 116 includes a low-band receive port 142, a low-band transmit port 144, a low-band power amplifier 146, and a low-band duplexer 148. The low-band receive port 142 is coupled to the low-band switching circuitry 106 via the low-band duplexer 148. Further, the low-band transmit port 144 is coupled to the low-band switching circuitry 106 via the low-band power amplifier 146 and the low-band duplexer 148. The low-band duplexer 148 is configured to separate low-band receive signals about a low-band operating band from low-band transmit signals about the low-band operating band, passing the signals appropriately to either the low-band receive port 142 or from the low-band transmit port 144 via the low-band power amplifier 146.

The mid-band transceiver circuitry 118 includes a mid-band receive port 150, a mid-band transmit port 152, a mid-band power amplifier 154, and a mid-band duplexer 156. The mid-band receive port 150 is coupled to the mid/high-band switching circuitry 108 and the mid-band diplexer switching circuitry 112 via the mid-band duplexer 156. Further, the mid-band transmit port 152 is coupled to the mid/high-band switching circuitry 108 and the mid-band diplexer switching circuitry 112 via the mid-band power amplifier 154 and the mid-band duplexer 156. The mid-band duplexer 156 is configured to separate mid-band receive signals about a mid-band operating band from mid-band transmit signals about the mid-band operating band, passing the signals appropriately to either the mid-band receive port 150 or from the mid-band transmit port 152 via the mid-band power amplifier 154.

The high-band transceiver circuitry 120 includes a high-band receive port 158, a high-band transmit port 160, a high-band power amplifier 162, and a high-band duplexer 164. The high-band receive port 158 is coupled to the mid/high-band switching circuitry 108 and the high-band diplexer switching circuitry 114 via the high-band duplexer 164. Further, the high-band transmit port 160 is coupled to the mid/high-band switching circuitry 108 and the high-band diplexer switching circuitry 114 via the high-band power amplifier 162 and the high-band duplexer 164. The high-band duplexer 164 is configured to separate high-band receive signals about a high-band operating band from high-band transmit signals about the high-band operating band, passing the signals appropriately to either the high-band receive port 158 or from the high-band transmit port 160 via the high-band power amplifier 162.

In operation, the antenna-side diplexer 104 passes low-band signals between the antenna 102 and the low-band switching circuitry 106 while attenuating other signals. Further, the antenna-side diplexer 104 passes mid-band and high-band signals between the antenna 102 and the mid/high-band switching circuitry 108 while attenuating other signals. The low-band switching circuitry 106 selectively routes low-band signals between the low-band output port 130 and the low-band transceiver ports 128. The mid/high-band switching circuitry 108 selectively routes mid-band and high-band signals between the mid/high-band output port 134 and the mid/high-band transceiver ports 132. The low-band transceiver circuitry 116 provides low-band transmit signals about a low-band operating band to the low-band switching circuitry 106 via the low-band power amplifier 146 and receives low-band signals about the low-band operating band from the low-band switching circuitry 106 at the low-band receive port 142. The mid-band transceiver circuitry 118 provides mid-band transmit signals about a mid-band operating band to the mid/high-band switching circuitry 108 via the mid-band power amplifier 154 and receives mid-band signals about the mid-band operating band from the mid/high-band switching circuitry 108 at the mid-band receive port 150. The high-band transceiver circuitry provides high-band transmit signals about a high-band operating band to the mid/high-band switching circuitry 108 via the high-band power amplifier 162 and receives high-band signals about the high-band operating band from the mid/high-band switching circuitry 108 at the high-band receive port 158.

Switching control circuitry 166 is coupled to the low-band switching circuitry 106 and provides a low-band switching control signal SW_CL in order to control the routing of signals between the low-band output port 130 and the low-band transceiver ports 128. Further, the switching control circuitry 166 is coupled to the mid/high-band switching circuitry 108 and provides a mid/high-band switching control signal SW_CMH in order to control the routing of signals between the mid/high-band output port 134 and the mid/high-band transceiver ports 132. Finally, the switching control circuitry 166 is coupled to the mid-band diplexer switching circuitry 112 and the high-band diplexer switching circuitry 114 and provides a mid-band diplexer switching control signal MB_SW and a high-band diplexer switching control signal HB_SW in order to control the orientation of the mid-band diplexer switching circuitry 112 and the high-band diplexer switching circuitry 114, respectively. Although a single control path from the switching control circuitry 166 to the various switching circuitry is shown to avoid obscuring the drawings, the control paths may be separate without departing from the principles of the present disclosure.

In a mid/high-band carrier aggregation configuration of the RF front end circuitry 100, the switching control circuitry 166 may provide the mid-band diplexer switching control signal MB_SW and the high-band diplexer switching control signal HB_SW such that the mid-band diplexer switching circuitry 112 and the high-band diplexer switching circuitry 114 are closed, thereby connecting the mid-band transceiver circuitry 118 to the mid-band diplexer port 136 and connecting the high-band transceiver circuitry 120 to the high-band diplexer port 138. Further, the mid/high-band switching circuitry 108 may connect the mid/high-band diplexer switching port 140 to the mid/high-band diplexer port 124. In this configuration of the RF front end circuitry 100, mid-band and high-band signals received at the antenna 102 may be routed to the carrier-aggregation diplexer 110, where they are separated and delivered to the mid-band transceiver circuitry 118 and the high-band transceiver circuitry 120, respectively. Accordingly, the RF front end circuitry 100 may operate in an inter-band carrier aggregation configuration between the mid-band operating band and the high-band operating band.

In a low/mid-band carrier aggregation configuration of the RF front end circuitry 100, the switching control circuitry 166 may provide the mid-band diplexer switching control signal MB_SW and the high-band diplexer switching control signal HB_SW such that the mid-band diplexer switching circuitry 112 and the high-band diplexer switching circuitry 114 are opened, thereby disconnecting the mid-band transceiver circuitry 118 from the mid-band diplexer port 136 and disconnecting the high-band transceiver circuitry 120 from the high-band diplexer port 138. Further, the low-band switching circuitry 106 may connect the low-band transceiver circuitry 116 to the low-band diplexer port 122 and the mid/high-band switching circuitry 108 may connect the mid-band transceiver circuitry 118 to the mid/high-band diplexer port 124. In this configuration of the RF front end circuitry 100, low-band signals from the antenna 102 are separated by the antenna-side diplexer 104 and delivered to the low-band transceiver circuitry 116, while mid-band signals from the antenna 102 are separated by the antenna-side diplexer 104 and delivered to the mid-band transceiver circuitry 118. Accordingly, the RF front end circuitry 100 may operate in an inter-band carrier aggregation configuration between the low-band operating band and the mid-band operating band.

The same principles discussed above may be utilized to realize a low/high-band carrier aggregation configuration in the RF front end circuitry 100. Further, multiple connections may be made by the low-band switching circuitry 106 and the mid/high-band switching circuitry 108 in order to operate in carrier aggregation configurations between more than two operating bands.

In one embodiment, the low-band operating band may be band 20, the mid-band operating band may be band 3, and the high-band operating band may be band 7. Those of ordinary skill in the art will appreciate that the principles of the present disclosure may be applied to any operating band or combination thereof to allow the RF front end circuitry 100 to operate in any number of different inter-band carrier aggregation configurations.

In a non-carrier aggregation configuration of the RF front end circuitry 100, the switching control circuitry 166 may provide the mid-band diplexer switching control signal MB_SW and the high-band diplexer switching control signal HB_SW such that the mid-band diplexer switching circuitry 112 and the high-band diplexer switching circuitry 114 are opened, thereby disconnecting the mid-band transceiver circuitry 118 from the mid-band diplexer port 136 and disconnecting the high-band transceiver circuitry 120 from the high-band diplexer port 138. Further, the low-band switching circuitry 106 and/or the mid/high-band switching circuitry 108 may connect appropriate transceiver circuitry to the antenna-side diplexer 104 such that the transceiver circuitry can appropriately transmit and/or receive signals via the antenna 102.

Although not shown for purposes of clarity, the RF front end circuitry 100 may include additional transceiver circuitry in order to support additional operating bands. The additional transceiver circuitry will generally be coupled to one or more of the transceiver ports on either the low-band switching circuitry 106 or the mid/high-band switching circuitry 108, depending on the particular operating band or operating bands supported by the transceiver circuitry.

While FIG. 7 shows the RF front end circuitry 100 using the antenna 102 and the antenna-side diplexer 104 to separate low-band and mid/high-band signals between the low-band switching circuitry 106 and the mid/high-band switching circuitry 108, the principles of the present disclosure equally apply to architectures using alternative means to separate low-band and mid/high-band signals between the low-band switching circuitry 106 and the mid/high-band switching circuitry 108. For example, a dual feed antenna may be used, or separate antennas for low-band signals and mid/high-band signals may be used without departing from the principles of the present disclosure.

Figure 8:
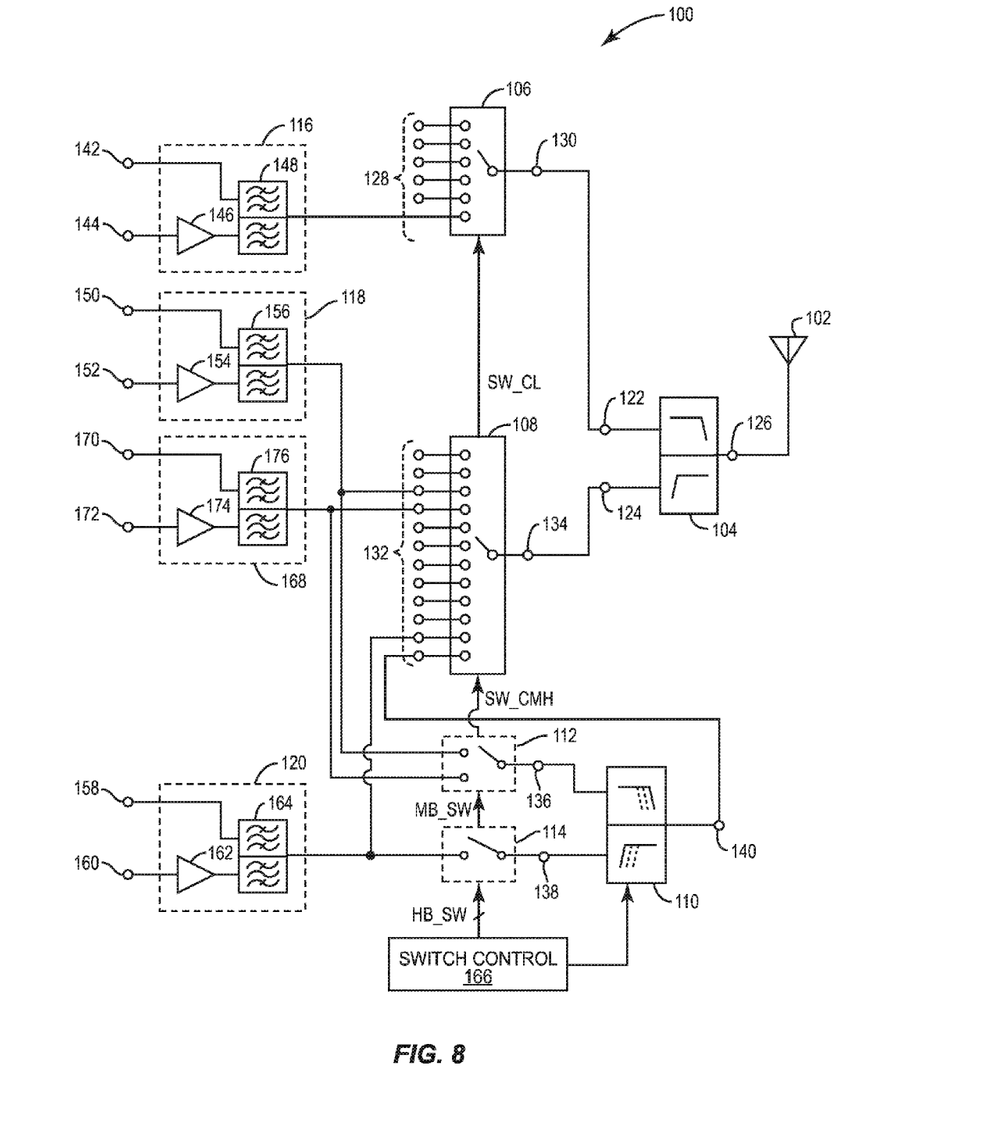
FIG. 8 is a schematic representation of RF front end circuitry according to an additional embodiment of the present disclosure.

FIG. 8 shows the RF front end circuitry 100 according to an additional embodiment of the present disclosure. The RF front end circuitry 100 shown in FIG. 8 is substantially similar to that shown in FIG. 7, but further includes additional mid-band transceiver circuitry 168, which is coupled to the mid-band diplexer switching circuitry 112 and a fourth one of the mid/high-band transceiver ports 132. Further, the mid-band diplexer switching circuitry 112 is a single-pole dual-throw (SPDT) switch, rather than a single-pole single-throw switch (SPST) as shown in FIG. 7. Finally, the carrier-aggregation diplexer 110 shown in FIG. 6 is tunable, as discussed in detail below. Providing the RF front end circuitry 100 as shown in FIG. 8 allows the RF front end circuitry 100 to support inter-band carrier aggregation configurations about multiple mid-band or high-band operating bands without the use of high-order filters.

The additional mid-band transceiver circuitry 168 includes an additional mid-band receive port 170, an additional mid-band transmit port 172, an additional mid-band power amplifier 174, and an additional mid-band duplexer 176. The additional mid-band receive port 170 is coupled to the mid/high-band switching circuitry 108 and the mid-band diplexer switching circuitry 112 via the additional mid-band duplexer 176. Further, the additional mid-band transmit port 172 is coupled to the mid/high-band switching circuitry 108 and the mid-band diplexer switching circuitry 112 via the additional mid-band power amplifier 174. The additional mid-band duplexer 176 is configured to separate mid-band receive signals about an additional mid-band operating band from mid-band transmit signals about the additional mid-band operating band, passing the signals appropriately to either the additional mid-band receive port 170 or from the additional mid-band transmit port 172 via the additional mid-band power amplifier 174.

The RF front end circuitry 100 operates as described above. The additional mid-band transceiver circuitry 168 provides mid-band transmit signals about the additional mid-band operating to the mid/high-band switching circuitry 108 via the additional mid-band power amplifier 174 and receives mid-band signals about the additional mid-band operating band from the mid/high-band switching circuitry 108 at the additional mid-band receive port 170.

In a first mid/high-band carrier aggregation configuration of the RF front end circuitry 100, the switching control circuitry 166 may provide the mid-band diplexer switching control signal MB_SW and the high-band diplexer switching control signal HB_SW such that the mid-band transceiver circuitry 118 is coupled to the mid-band diplexer port 136 and the high-band transceiver circuitry 120 is coupled to the high-band diplexer port 138. Further, the mid/high-band switching circuitry 108 may connect the mid/high-band diplexer switching port 140 to the mid/high-band diplexer port 124. Finally, the carrier-aggregation diplexer 110 is tuned such that mid-band signals about the mid-band operating band are passed from the mid/high-band switching circuitry 108 to the mid-band diplexer port 136 while attenuating other signals and high-band signals about the high-band operating band are passed from the mid/high-band switching circuitry 108 to the high-band diplexer port 138 while attenuating other signals. In this configuration of the RF front end circuitry 100, mid-band and high-band signals received at the antenna 102 may be routed to the carrier-aggregation diplexer 110, where they are separated and delivered to the mid-band transceiver circuitry 118 and the high-band transceiver circuitry 120, respectively. Accordingly, the RF front end circuitry 100 may operate in an inter-band carrier aggregation configuration between the mid-band operating band and the high-band operating band.

In a second mid/high-band carrier aggregation configuration of the RF front end circuitry 100, the switching control circuitry 166 may provide the mid-band diplexer switching control signal MB_SW and the high-band diplexer switching control signal HB_SW such that the additional mid-band transceiver circuitry 168 is coupled to the mid-band diplexer port 136 and the high-band transceiver circuitry 120 is coupled to the high-band diplexer port. Further, the mid/high-band switching circuitry 108 may connect the mid/high-band diplexer switching port 140 to the mid/high-band diplexer port 124. Finally, the carrier-aggregation diplexer 110 is tuned such that mid-band signals about the additional mid-band operating band are passed from the mid/high-band switching circuitry 108 to the mid-band diplexer port 136 while attenuating other signals and high-band signals about the high-band operating band are passed from the mid/high-band switching circuitry 108 to the high-band diplexer port 138 while attenuating other signals. In this configuration of the RF front end circuitry 100, mid-band and high-band signals received at the antenna 102 may be routed to the carrier-aggregation diplexer 110, where they are separated and delivered to the mid-band transceiver circuitry 118 and the high-band transceiver circuitry 120, respectively. Accordingly, the RF front end circuitry 100 may operate in an inter-band carrier aggregation configuration between the additional mid-band operating band and the high-band operating band.

In other carrier aggregation configurations such as low/mid-band carrier aggregation configurations, low/high-band carrier aggregation configurations, and non-carrier aggregation configurations, the RF front end circuitry 100 shown in FIG. 8 operates as described above with respect to FIG. 7.

In one embodiment, the low-band operating band may be band 20, the mid-band operating band may be band 3, the additional mid-band operating band may be band 1, and the high-band operating band may be band 7. Those of ordinary skill in the art will appreciate that the principles of the present disclosure may be applied to any operating band or combination thereof to allow the RF front end circuitry 100 to operate in any number of different inter-band carrier aggregation configurations.

Figure 9:
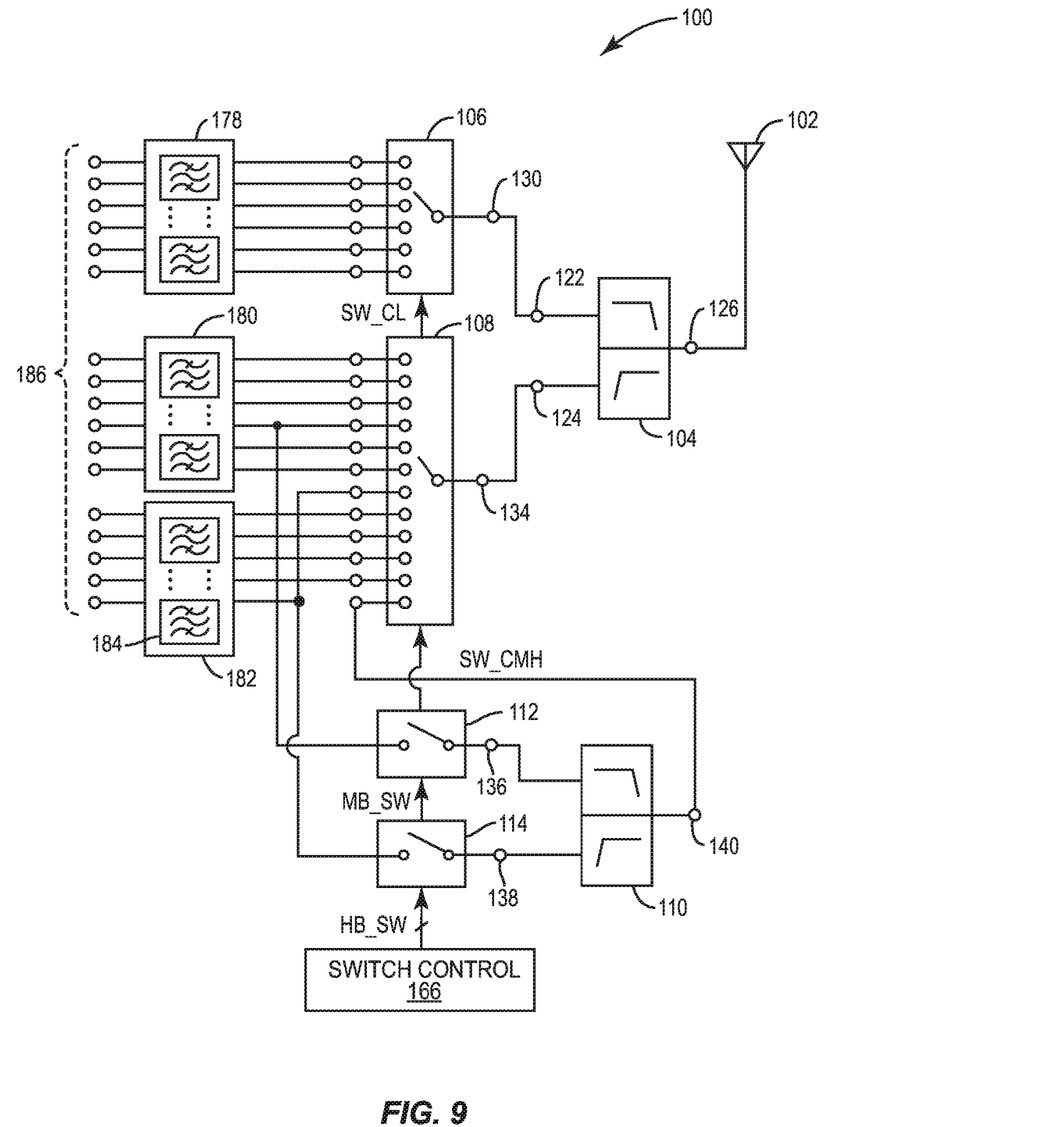
FIG. 9 is a schematic representation of RF front end circuitry according to an additional embodiment of the present disclosure.

FIG. 9 shows the RF front end circuitry 100 according to yet another embodiment of the present disclosure. The RF front end circuitry 100 shown in FIG. 9 is substantially similar to that shown in FIG. 7 except that the low-band transceiver circuitry 116, the mid-band transceiver circuitry 118, and the high-band transceiver circuitry 120 are respectively replaced with low-band diversity receiver circuitry 178, mid-band diversity receiver circuitry 180, and high-band diversity receiver circuitry 182. The low-band diversity receiver circuitry 178, the mid-band diversity receiver circuitry 180, and the high-band diversity receiver circuitry 182 each include a number of diversity receiver filters 184 configured to pass a particular operating band between the respective switching circuitry and a particular one of a number of diversity receiver ports 186. The RF front end circuitry 100 shown in FIG. 9 will operate in a substantially similar manner as that described above with respect to FIG. 7.

Figure 10:
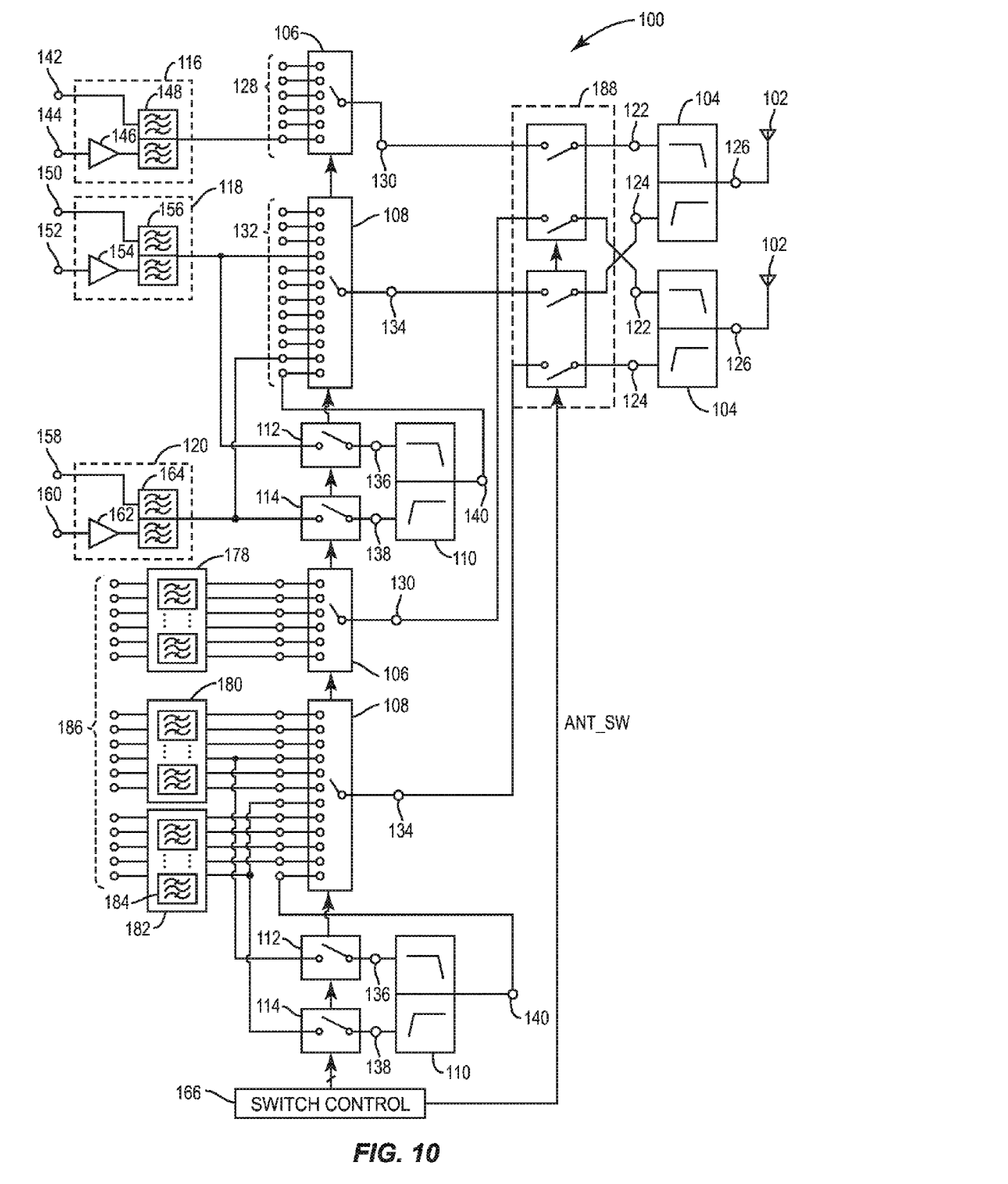
FIG. 10 is a schematic representation of RF front end circuitry according to an additional embodiment of the present disclosure.

FIG. 10 shows the RF front end circuitry 100 including both the transceiver circuitry as shown in FIG. 7 and the diversity receiver circuitry shown in FIG. 9. Further, the RF front end circuitry 100 shown in FIG. 10 includes antenna switching circuitry 188 coupled between each one of the antenna-side diplexers 104 and the switching circuitry 106 and 108. The RF front end circuitry 100 shown operates in a substantially similar manner as that described above with respect to FIG. 7. An antenna switching control signal ANT_SW provided from the switching control circuitry 166 determines which one of the antennas 102 is used as a main antenna and which one of the antennas 102 is used as a diversity antenna.

Those skilled in the art will recognize improvements and modifications to the embodiments of the present disclosure. All such improvements and modifications are considered within the scope of the concepts disclosed herein and the claims that follow.

What is claimed is:

1. Radio frequency (RF) front end circuitry comprising:
    mid/high-band switching circuitry configured to receive and selectively route mid-band and high-band signals between a mid/high-band output port and a plurality of mid/high-band transceiver ports;
    a carrier-aggregation diplexer coupled to a first one of the plurality of mid/high-band transceiver ports and configured to pass mid-band signals between a mid-band diplexer port and the first one of the plurality of mid/high-band transceiver ports while attenuating other signals and pass high-band signals between a high-band diplexer port and the first one of the plurality of mid/high-band transceiver ports while attenuating other signals;

mid-band transceiver circuitry coupled between the mid-band diplexer port and a second one of the plurality of mid/high-band transceiver ports; and high-band transceiver circuitry coupled between the high-band diplexer port and a third one of the plurality of mid/high-band transceiver ports.

2. The RF front end circuitry of claim 1 further comprising:

a single-feed antenna port;

low-band switching circuitry configured to receive and selectively route low-band signals between a low-band output port and a plurality of low-band transceiver ports; and an antenna-side diplexer coupled between the single-feed antenna port, the low-band output port, and the mid/high-band output port and configured to pass low-band signals between the single-feed antenna port and the low-band output port while attenuating other signals and pass mid-band and high-band signals between the single-feed antenna port and the mid/high-band output port while attenuating other signals.

3. The RF front end circuitry of claim 2 further comprising switching control circuitry coupled to the low-band switching circuitry and the mid/high-band switching circuitry.

4. The RF front end circuitry of claim 3 wherein the switching control circuitry is configured to:

provide a low-band switching control signal to the low-band switching circuitry in order to control the routing of low-band signals between the antenna-side diplexer and the plurality of low-band transceiver ports; and provide a mid/high-band switching control signal to the mid/high-band switching circuitry in order to control the routing of mid/high-band signals between the antenna-side diplexer and the plurality of mid/high-band transceiver ports.

5. The RF front end circuitry of claim 1 wherein the mid-band transceiver circuitry comprises:

mid-band receive port;

a mid-band power amplifier; and a mid-band duplexer coupled between the mid-band diplexer port, the mid-band receive port, and an output of the mid-band power amplifier, wherein the mid-band duplexer is configured to route mid-band receive signals between the mid-band diplexer port and the mid-band receive port while attenuating other signals and route mid-band transmit signals between the output of the mid-band power amplifier and the mid-band diplexer port while attenuating other signals.

6. The RF front end circuitry of claim 5 wherein the high-band transceiver circuitry comprises:

a high-band receive port;

a high-band power amplifier; and a high-band duplexer coupled between the high-band diplexer port, the high-band receive port, and an output of the high-band power amplifier and configured to route high-band receive signals between the high-band diplexer port and the high-band receive port while attenuating other signals and route high-band transmit signals between the output of the high-band power amplifier and the high-band diplexer port while attenuating other signals.

7. The RF front end circuitry of claim 1 wherein in a carrier aggregation mode of operation of the RF front end circuitry:

the mid-band transceiver circuitry is configured to provide transmit signals about a mid-band operating band to the mid-band diplexer port and receive signals about the mid-band operating band from the mid-band diplexer port; and the high-band transceiver circuitry is configured to provide transmit signals about a high-band operating band to the high-band diplexer port and receive signals about the high-band operating band from the high-band diplexer port.

8. The RF front end circuitry of claim 7 wherein the mid-band operating band is band 3 and the high-band operating band is band 7.

9. The RF front end circuitry of claim 1 further comprising:

a mid-band diplexer switch coupled between the carrier-aggregation diplexer and the mid-band transceiver circuitry and configured to selectively couple the mid-band transceiver circuitry to the mid-band diplexer port; and a high-band diplexer switch coupled between the carrier-aggregation diplexer and the high-band transceiver circuitry and configured to selectively couple the high-band transceiver circuitry to the high-band diplexer port.

10. The RF front end circuitry of claim 9 wherein:

the mid-band transceiver circuitry is further coupled to the second one of the plurality of mid/high-band transceiver ports; and the high-band transceiver circuitry is further coupled to the third one of the plurality of mid/high-band transceiver ports.

11. The RF front end circuitry of claim 10 wherein:

in a carrier aggregation mode of operation of the RF front end circuitry, the mid-band diplexer switch and the high-band diplexer switch are closed such that the mid-band transceiver circuitry is coupled to the mid-band diplexer port and the high-band transceiver circuitry is coupled to the high-band diplexer port; and in a non-carrier aggregation mode of operation of the RF front end circuitry, the mid-band diplexer switch and the high-band diplexer switch are opened such that the mid-band transceiver circuitry is not coupled to the mid-band diplexer port and the high-band transceiver circuitry is not coupled to the high-band diplexer port.

12. The RF front end circuitry of claim 9 wherein the mid-band transceiver circuitry comprises:

a mid-band receive port;

a mid-band power amplifier; and a mid-band duplexer coupled between the mid-band diplexer port, the mid-band receive port, and an output of the mid-band power amplifier, wherein the mid-band duplexer is configured to route mid-band receive signals between the mid-band diplexer port and the mid-band receive port while attenuating other signals and route mid-band transmit signals between the output of the mid-band power amplifier and the mid-band diplexer port while attenuating other signals.

13. The RF front end circuitry of claim 12 wherein the high-band transceiver circuitry comprises:
a high-band receive port;
a high-band power amplifier; and
a high-band duplexer coupled between the high-band diplexer port, the high-band receive port, and an output of the high-band power amplifier and configured to route high-band receive signals between the high-band diplexer port and the high-band receive port while attenuating other signals and route high-band transmit signals between the output of the high-band power amplifier and the high-band diplexer port while attenuating other signals.

14. The RF front end circuitry of claim 9 wherein in a carrier aggregation mode of operation of the RF front end circuitry:
the mid-band transceiver circuitry is configured to provide transmit signals about a mid-band operating band to the mid-band diplexer port and receive signals about the mid-band operating band from the mid-band diplexer port; and
the high-band transceiver circuitry is configured to provide transmit signals about a high-band operating band to the high-band diplexer port and receive signals about the high-band operating band from the high-band diplexer port.

15. The RF front end circuitry of claim 14 wherein the mid-band operating band is band 3 and the high-band operating band is band 7.

16. The RF front end circuitry of claim 1 wherein the carrier-aggregation diplexer is tunable.

17. The RF front end circuitry of claim 16 further comprising:
a mid-band diplexer switch configured to selectively route mid-band signals between the mid-band diplexer port, a first mid-band switching port, and a second mid-band switching port;
a high-band diplexer switch configured to selectively route high-band signals between the high-band diplexer port and a high-band switching port;
first mid-band transceiver circuitry coupled to a first mid-band switching port;
second mid-band transceiver circuitry coupled to a second mid-band switching port; and
the high-band transceiver circuitry coupled to the high-band switching port.

18. The RF front end circuitry of claim 17 wherein:
the first mid-band transceiver circuitry is further coupled to the second one of the plurality of mid/high-band transceiver ports;
the second mid-band transceiver circuitry is further coupled to the third one of the plurality of mid/high-band transceiver ports; and
the high-band transceiver circuitry is further coupled to a fourth one of the plurality of mid/high-band transceiver ports.

19. The RF front end circuitry of claim 18 wherein:
in a first carrier aggregation mode of the RF front end circuitry, the mid-band diplexer switch couples the mid-band diplexer port to the first mid-band switching port, the high-band diplexer switch couples the high-band diplexer port to the high-band switching port, and the carrier-aggregation diplexer is tuned to route signals about a first mid-band operating band between the first one of the plurality of mid/high-band transceiver ports and the first mid-band switching port and route signals about a high-band operating band between the first one of the plurality of mid/high-band transceiver ports and the high-band switching port;
in a second carrier aggregation mode of the RF front end circuitry, the mid-band diplexer switch couples the mid-band diplexer port to the second mid-band switching port, the high-band diplexer switch couples the high-band diplexer port to the high-band switching port, and the carrier-aggregation diplexer is tuned to route signals about a second mid-band operating band between the first one of the plurality of mid/high-band transceiver ports and the second mid-band switching port and route signals about the high-band operating band between the first one of the plurality of mid/high-band transceiver ports and the high-band switching port; and
in a non-carrier aggregation mode the mid-band diplexer switch is opened such that neither the first mid-band transceiver circuitry nor the second mid-band transceiver circuitry are coupled to the mid-band diplexer port and the high-band diplexer switch is opened such that the high-band transceiver circuitry is not coupled to the high-band diplexer port.

20. The RF front end circuitry of claim 17 wherein in a carrier aggregation mode of operation of the RF front end circuitry:
the first mid-band transceiver circuitry is configured to provide transmit signals about a first mid-band operating band to the first mid-band switching port and receive signals about the first mid-band operating band from the first mid-band switching port;
the second mid-band transceiver circuitry is configured to provide transmit signals about a second mid-band operating band to the second mid-band switching port and receive signals about the second mid-band operating band from the second mid-band switching port; and
the high-band transceiver circuitry is configured to provide transmit signals about a high-band operating band to the high-band switching port and receive signals about the high-band operating band from the high-band switching port.

21. The RF front end circuitry of claim 20 wherein the first mid-band operating band is band 1, the second mid-band operating band is band 3, and the high-band operating band is band 7.

* * * * *